US012094252B2

(12) United States Patent
El Youssoufi et al.

(10) Patent No.: US 12,094,252 B2
(45) Date of Patent: Sep. 17, 2024

(54) OCCLUSION-AWARE PREDICTION OF HUMAN BEHAVIOR

(71) Applicant: Humanising Autonomy Limited, London (GB)

(72) Inventors: Wassim El Youssoufi, London (GB); Dominic Noy, London (GB); Yazhini Chitra Pradeep, London (GB); James Over Everard, Manningtree (GB); Leslie Cees Nooteboom, London (GB); Raunaq Bose, London (GB); Maya Audrey Lara Pindeus, London (GB)

(73) Assignee: HUMANISING AUTONOMY LIMITED, London (GB)

( * ) Notice: Subject to any disclaimer, the term of this patent is extended or adjusted under 35 U.S.C. 154(b) by 254 days.

(21) Appl. No.: 17/549,680

(22) Filed: Dec. 13, 2021

(65) Prior Publication Data
US 2022/0189210 A1     Jun. 16, 2022

Related U.S. Application Data

(60) Provisional application No. 63/124,326, filed on Dec. 11, 2020.

(51) Int. Cl.
*G06K 9/00*     (2022.01)
*G06T 7/70*     (2017.01)
*G06V 40/20*    (2022.01)

(52) U.S. Cl.
CPC ............. *G06V 40/23* (2022.01); *G06T 7/70* (2017.01); *G06T 2207/20081* (2013.01); *G06T 2207/30196* (2013.01)

(58) Field of Classification Search
CPC .......................................... G06T 2207/20081
See application file for complete search history.

(56) References Cited

U.S. PATENT DOCUMENTS 10,049,307 B2 *   8/2018   Pankanti ................ G06N 3/084
10,699,421 B1 *   6/2020   Cherevatsky ......... G06V 20/52
(Continued)

OTHER PUBLICATIONS

International Search Report and Written Opinion, Patent Cooperation Treaty Application No. PCT/IB2021/000855, Apr. 29, 2022, 19 pages.

(Continued)

*Primary Examiner* — Hadi Akhavannik
(74) *Attorney, Agent, or Firm* — FENWICK & WEST LLP

(57) ABSTRACT

An occlusion analysis system improves accuracy of behavior prediction models by generating occlusion parameters that may inform mathematical models to generate more accurate predictions. The occlusion analysis system trains and applies models for generating occlusion parameters, such as a manner in which a person is occluded, occlusion percentage, occlusion type. A behavior prediction system may input the occlusion parameters as well as other parameters relating to activity of the human into a second mathematical model for behavior prediction. The second machine learning model is a higher-level model trained to output a prediction that the human will exhibit a future behavior and a confidence level associated with the prediction. The confidence level is at least partially determined based on the occlusion parameters. The behavior prediction system may output the prediction and the confidence level to a control system that generates commands associated with a vehicle and other intelligent video analytics systems.

16 Claims, 6 Drawing Sheets

(56) References Cited

U.S. PATENT DOCUMENTS

| | | | |
|---|---|---|---|
| 2014/0347475 A1 | 11/2014 | Divakaran et al. | |
| 2018/0144476 A1* | 5/2018 | Smith | G06T 7/174 |
| 2021/0158098 A1* | 5/2021 | Shimizu | G06T 7/11 |
| 2022/0117196 A1* | 4/2022 | Kozachenok | A01K 61/80 |
| 2022/0130145 A1* | 4/2022 | Connary | G06V 20/10 |
| 2022/0189210 A1* | 6/2022 | El Youssoufi | G06V 20/58 |

OTHER PUBLICATIONS

Chen, Kai et al., "An Integrated Deep Learning Framework for Occluded Pedestrian Tracking", IEEE Access, vol. 7, pp. 26060-26072, XP011713324, DOI: 10.1109/ACCESS.2019.2900296 [retrieved on Mar. 6, 2019].

Cheng, Yu et al., "Occlusion-Aware Networks for 3D Human Pose Estimation in Video", 2019 IEEE/CVF International Conference on Computer Vision (ICCV), IEEE, Oct. 27, 2019 (Oct. 27, 2019), pp. 723-732, XP033723978, DOI: 10.1109/ICCV.2019.00081 [retrieved on Feb. 24, 2020].

Cielniak, G. et al., "Data association and occlusion handling for vision-based people tracking by mobile robots", Robotics and Autonomous Systems, Elsevier BV, Amsterdam, NL, vol. 58, No. 5, May 31, 2010 (May 31, 2010), pp. 435-443, XP026989409, Issn: 0921-8890 [retrieved on Feb. 17, 2010].

Kumar, B. K. Shreyamsha et al., "Visual tracking using structural local DCT sparse appearance model with occlusion detection", Multimedia Tools and Applications, Kluwer Academic Publishers, Boston, US, vol. 78, No. 6, Aug. 8, 2018, pp. 7243-7266, XP036755927, ISSN: 1380-7501, DOI:10.1007/SII042-018-6453-Z [retrieved on Aug. 8, 2018].

Meshgi, Kourosh et al., "An occlusion-aware particle filter tracker to handle complex and persistent occlusions", Computer Vision and Image Understanding, Academic Press, US, vol. 150, May 24, 2016 (May 24, 2016), pp. 81-94, XP029628353, ISSN: 1077-3142, DOI: 10.1016/J.CVIU.2016.05.011.

Rosales, R. et al., "A framework for heading-guided recognition of human activity", Computer Vision and Image Understanding, Academic Press, US, vol. 91, No. 3, Sep. 1, 2003 (Sep. 1, 2003), pp. 335-367, XP004455850, ISSN: 1077-3142, DOI:10.1016/S1077-3142(03)00096-1.

Shu, Guang et al., "Part-based multiple-person tracking with partial occlusion handling", Computer Vision and Pattern Recognition (CVPR), 2012 IEEE Conference on, IEEE, Jun. 16, 2012 (Jun. 16, 2012), pp. 1815-1821, XP032232278, DOI: 10.1109/CVPR.2012.6247879 ISBN: 978-1-4673-1226-4.

Sun, Shiying et al., "Fast and Robust RGB-D Multiple Human Tracking Based on Part Model for Mobile Robots", 2019 Chinese Control Conference (CCC), Technical Committee on Control Theory, Chinese Association of Automation, Jul. 27, 2019, pp. 4525-4530, XP033632348, DOI: 10.23919/CHICC.2019.8866103 [retrieved on Oct. 10, 2019].

Tang, Siyu et al., "Detection and Tracking of Occluded People", arxiv.org, Cornell University Library, 201 Olin Library Cornell University Ithaca, NY 14853, vol. 110, No. 1, Nov. 8, 2013 (Nov. 8, 2013), pp. 58-69, XP035398568, DOI: 10.1007/S11263-013-0664-6 [retrieved on Nov. 8, 2013].

* cited by examiner

600 receiving a video comprising a sequence of frames where at least a part of a human is visible in a first frame of the sequence of frames
610 applying the sequence of frames to an occlusion model, wherein the occlusion model is a machine learning model trained to detect occlusion of the human in the video
620 receiving, as output from the occlusion model, one or more occlusion parameters
630 inputting the one or more occlusion parameters as well as other parameters relating to activity of the human into a second machine learning model, the second machine learning model trained to output a prediction that the human will exhibit a future behavior and a confidence level associated with the prediction
640 outputting the prediction and the confidence level to a control system
650

FIG. 6

OCCLUSION-AWARE PREDICTION OF HUMAN BEHAVIOR

BACKGROUND

When making predictions about human behavior with computer vision-based technology, a frequent issue is that a human being in video frames may be occluded, as humans are often temporarily hidden from cameras behind other objects or other people in the environment. Occlusion poses challenges in understanding what behavior a person is likely to exhibit in the near future, as key points used to drive machine learning analysis of behavior are not visible in images input into models. Yet further, where a person is fully occluded, challenges are posed in determining whether someone is the same person when they re-appear from the occlusion, as tracking may rely on the occluded key points. When using existing systems, occlusions often cause improper assumptions, which lead to improper predictions. For example, if a person is behind a wall and their legs are occluded, existing systems might assume that the person is not moving while they actually are or assume that the person is a different person when the occlusion is removed.

SUMMARY

Systems and methods are disclosed herein for an occlusion analysis system for predicting human behaviors. The occlusion analysis system receives input images or video streams and uses the collected data to train and apply machine learning models to determine various metrics about occlusion. The occlusion analysis system may train machine learning models (e.g., occlusion detection modules) using training datasets, where the datasets may include inputs, along with one or more labels that characterize the images. In one embodiment, the occlusion analysis system may adjust outputs of a behavior prediction system based on the additional occlusion information. The inputs may include images, such as from raw video footage or cropped video footage of a person. (Person is exemplary and can be Vulnerable Road Users including animals and non-humans.) The occlusion analysis system may generate outputs that include information about occlusions (e.g., occlusion parameters), such as a manner in which a person is occluded, a level of occlusion (e.g., a percentage), a type of occlusion, and so on. Types of occlusion may include, for example, that a pedestrian is occluding another pedestrian, horizontal occlusion, vertical occlusion, a transparent occlusion (e.g., a cross-hatched fence obscures part of a human, though the human is generally transparent), and so on. The models may take images (e.g., optionally along with other auxiliary information), and may output data that can then provide an understanding of occlusion, together with detection metrics. The generated outputs from the occlusion analysis system are passed to a behavior prediction system for determining a confidence level for behavior prediction or providing additional information for the behavior prediction models.

The disclosed systems and methods provide several advantageous technical features. For example, the disclosed systems and methods improve accuracy of behavior prediction models by incorporating occlusion information to inform individual models, and results from the occlusion analysis system may inform motion models to generate more accurate tracking and improve movement predictions. In addition to outputting information representing that a person is partially or wholly occluded, the occlusion analysis system may also output an indication of how the person is occluded, which allows behavior prediction models to determine the certainty of the detection and further models that rely on that detection.

For example, in trying to determine whether a person is walking or not, where a person's legs are occluded by a hedge, a locomotion model determining whether the person is walking or not becomes aware based on the occlusion model's output of a confidence level that it is relying on limited data to make its estimation, given occlusion information being used as an input in addition to images/video. Providing such information to the locomotion model will increase its accuracy (e.g., in that it may access other model outputs that have sufficient information to drive predictions) and allow for a more interpretable model, which is crucial for functional safety and edge case detection.

Further, the disclosed systems and methods may predict a full bounding box based on a partially occluded image of a person. The predicted full bounding box may be further used for distance estimations, which are improved through bounding box corrections and pose occlusion understanding. With regard to training, the occlusion analysis system providing additional occlusion information for generating training data. A labeled training set including occlusion information makes behavior prediction models more robust, as the training dataset makes the models more appropriate for the real-world environment that the models will be placed in, which has many occlusions, rather than picture perfect visible people. Even more, the occlusion analysis system provides additional insights for understanding human behaviors, such as determining pedestrian behavior based on group behaviors, determining physical limitations of human behaviors (e.g., a person walking behind a fence), and much more that is discussed in the description below.

BRIEF DESCRIPTION OF THE DRAWINGS

FIG. 6 depicts an exemplary process for predicting human behavior based on occlusion analysis, in accordance with one embodiment.

The figures depict various embodiments of the present invention for purposes of illustration only. One skilled in the art will readily recognize from the following discussion that alternative embodiments of the structures and methods illustrated herein may be employed without departing from the principles of the invention described herein.

DETAILED DESCRIPTION

System Overview

Figure 1:
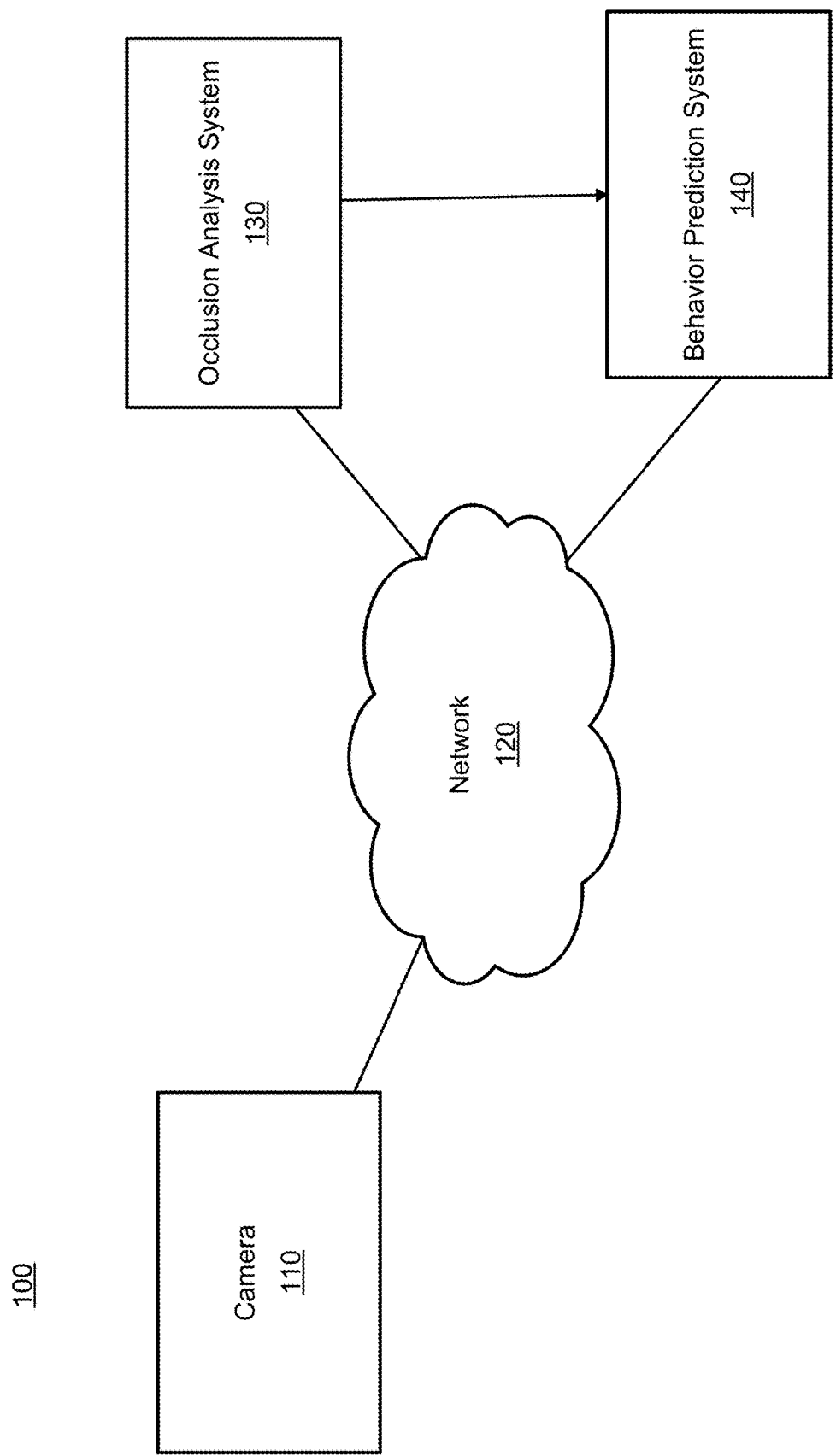
FIG. 1 depicts an exemplary system environment for an occlusion analysis system, in accordance with one embodiment.

FIG. 1 depicts an exemplary system environment for an occlusion analysis system, in accordance with one embodiment. Environment 100 includes camera 110, network 120, occlusion analysis system 130, and a behavior prediction system 140. Camera 110 captures images or records video streams of surroundings and transmits data via network 120 to occlusion analysis system 130 and behavior prediction system 140. Camera 110 is typically operably coupled to a vehicle, such as an autonomous or semi-autonomous vehicle. In some embodiments, camera 110 can be coupled with infrastructure and other applications, such as smartphones, augmented reality equipment, dashcam, roadside cameras, doorbells, monitoring cameras, etc. Camera 110 may also be any infrastructure or application that can capture images. Information from camera 110 in infrastructure or non-vehicle applications may be used as input in conjunction with input from cameras that are coupled to vehicles. The term operably coupled, as used herein, may refer to being directly or indirectly attached to a vehicle and/or in communication with a computer of a vehicle. For example, the camera 110 may be installed on the vehicle and enables the vehicle to recognize surroundings by capturing images and/or video streams of the environment. The vehicle may be an automobile (that is, any powered four-wheeled or two-wheeled vehicle). Camera 110 may be integrated into the vehicle, or may be a standalone (e.g., dedicated camera) or integrated device (e.g., client device such as a smartphone or dashcam mounted on vehicle). While only one camera 110 is depicted, any number of cameras may be operably coupled to the vehicle and may act independently (e.g., videos/images are processed without regard to one another) or in concert (e.g., videos/images may be captured in sync with one another and may be stitched together to capture wider views).

Network 120 may be any data network, such as the Internet. In some embodiments, network 120 may be a local data connection to camera 110. In one embodiment, network 120 provides the communication channels via which the other elements of the environment 100 communicate. The network 120 can include any combination of local area and/or wide area networks, using both wired and/or wireless communication systems. In one embodiment, the network 120 uses standard communications technologies and/or protocols. For example, the network 120 can include communication links using technologies such as Ethernet, 802.11, worldwide interoperability for microwave access (WiMAX), 3G, 4G, 5G, code division multiple access (CDMA), digital subscriber line (DSL), etc. Examples of networking protocols used for communicating via the network 120 include multiprotocol label switching (MPLS), transmission control protocol/Internet protocol (TCP/IP), hypertext transport protocol (HTTP), simple mail transfer protocol (SMTP), and file transfer protocol (FTP). Data exchanged over the network 120 may be represented using any suitable format, such as hypertext markup language (HTML) or extensible markup language (XML). In some embodiments, all or some of the communication links of the network 120 may be encrypted using any suitable technique or techniques.

In one embodiment, the network 120 may be other means of connection instead of internet based connections. The network 120 may be a GPU (Graphics Processing Unit), microchips, or any processing units mounted with the camera. The GPU or microchips may take as inputs data collected by the camera 110, and may feed the collected data to the occlusion analysis system 130 and behavior prediction system 140 for further analysis. The occlusion analysis system 130 and behavior prediction system 140 may reside on cloud or on GPU/microchips connected with the camera 110.

The behavior prediction system 140 predicts human behaviors based on data collected from surroundings. The behavior prediction system 140 determines a probability that a person will exhibit a behavior (e.g., continue on a current path (e.g., in connection with controlling an autonomous vehicle, become distracted, intend to cross a street, actually cross a street, become aware of a vehicle, and so on). In an embodiment, the behavior prediction system 130 receives an image depicting a person, such as an image taken from a camera of a vehicle on a road. The behavior prediction system 130 inputs at least a portion of the image (or feature vectors extracted from the image) into a model (e.g., a mathematical model, a machine learning model, or a statistical model), and receives, as output from the model, a plurality of probabilities describing the person, each of the probabilities corresponding to a probability that the person is in a given state. The behavior prediction system 130 determines, based on at least some of the plurality of probabilities, a probability that the person will exhibit the behavior (e.g., continue on the current path), and outputs the probability that the person will exhibit the behavior to a control system. The disclosure of commonly owned U.S. patent application Ser. No. 16/857,645, filed on Apr. 24, 2020 and titled "Tracking Vulnerable Road Users Across Image Frames Using Fingerprints Obtained from Image Analysis," which discloses more information with regard to a multi-task model with different branches each trained to form a prediction about a person, is hereby incorporated by reference herein in its entirety. Further information on combining different classifications into behavior prediction is discussed in the U.S. patent application Ser. No. 17/011,854, filed on Sep. 3, 2020, and titled "Modular Predictions for Complex Human Behaviors," the disclosure of which is hereby incorporated by reference herein in its entirety.

The behavior prediction system 140 may take outputs from the occlusion analysis system 130 for determining a level of certainty for predictions. When higher level human behaviors are inferred by a modular approach that combines multiple models together, an understanding of the certainty of such underlying models, increases the accuracy and allows for a more accurate uncertainty value for such predictions. Confidence scores and uncertainty values, as well as various lower and higher level models, are described in further detail in commonly-owned U.S. patent application Ser. No. 17/011,854, filed Sep. 3, 2020, the disclosure of which is hereby incorporated by reference herein in its entirety, and the disclosure of which is reproduced herein. Manners of tracking VRUs who are partially or fully occluded are described in further detail in commonly-owned U.S. patent application Ser. No. 16/857,645, filed Apr. 24, 2020, the disclosure of which is hereby incorporated by reference herein in its entirety, and the disclosure of which is reproduced herein. In an embodiment, the model may receive input from the tracking model described in U.S. patent application Ser. No. 16/857,645 to identify information about an occlusion. For example, where two bounding box detections overlap one another, as determined using the tracking model, the system identifies a likelihood that one person is occluding another. Accordingly, tracking model outputs may be input into one or more models described herein to determine additional occlusions, as well as how and why those occlusions are occurring.

The behavior prediction system 140 may generate predictions and/or confidence scores and output the results to a control system, which may output commands based thereon. The commands may include transmitting an instruction to a vehicle control system to take action (e.g., halt the vehicle, honk a horn, swerve, lower speed, etc.). The commands may include storing the information to a database for subsequent analysis. The commands may include outputting a message to a vehicle operator (e.g., via a display installed on a dashboard of a vehicle). The commands may include augmenting a video feed (e.g., on a dashcam to highlight certain data). The commands may include annotating data on a recorded video feed. The commands may include transmitting an instruction to robots (e.g., working robots in a warehouse) for environment-aware movement. The commands may include transmitting an instruction to working vehicles such as motor vehicles, railed vehicles, watercrafts, amphibious vehicles, and aircrafts. The commands may include sending instructions to personnel for adjusting environment settings (e.g., lighting and glare).

Occlusion Analysis System

The occlusion analysis system 130 trains and applies mathematical models (e.g., machine learning models or statistical models) for generating output occlusion parameters that allow the behavior prediction system 140 to leverage occlusion information in predicting human behaviors. In one embodiment, the occlusion analysis system 130 operates in parallel with the sub-models (e.g., detection model, pose estimation model, gaze estimation model, tracking model, etc.) of the behavior prediction system 140. In some embodiments, the occlusion analysis system 130 is embedded into the sub-models. The occlusion analysis system 130 may use training data including images, or a sequence of images such as from raw video footage or cropped video footage of a vulnerable road user (VRU). The images may be a sequence of frames and at least one of the frames include a person that is partially or wholly occluded. The occlusion analysis system 130 may generate occlusion parameters that include information about occlusions, such as a manner in which a person is occluded, a level of occlusion (e.g., a percentage), a type of occlusion, etc. Types of occlusion may include, for example, that a pedestrian is occluding another pedestrian, horizontal occlusion, vertical occlusion, a transparent occlusion (e.g., a cross-hatched fence obscures part of a human, though the human is generally transparent), and so on. Exemplary manners in which a person is occluded may include a portion of the body that is occluded (e.g., the back of the head and peripherals if a human is wearing a hoodie, the ear if the human is carrying a telephone to his ear, the eyes if blind person glasses are detected, and so on). The training data may be labeled by human classifiers, where the human classifiers may label each image (or each person in the image) with an indication of occlusion. The human classifiers may also label the training data by enclosing occluded person in bounding boxes (or circles, polygons, etc.). The training data may also be labeled with other occlusion information such as type and manner of occlusions. In one embodiment, certain occlusions are labeled with the objects that cause the occlusions for a better understanding of behavior. For example, a side view of a person with one leg occluded may indicate that the person is riding a motorbike, and a front view of a person with one leg occluded may indicate that the person is riding an e-scooter. The labeled dataset is then used for training one or more machine learning models that output occlusion parameters.

The occlusion analysis system 130 may train one or more models (e.g., machine learning models and/or statistical/mathematical models) for occlusion analysis using the labeled dataset. After the machine learning models are trained, the occlusion analysis system 130 may take images (e.g., optionally along with other auxiliary information), and may use the trained machine learning models to output occlusion parameters that can then provide an understanding of occlusion, together with detection metrics. The occlusion parameters may be passed to the behavior prediction system 140 for providing additional insights into human behaviors. This allows a model to determine the certainty of the detection and further models that rely on that detection. The occlusion analysis system 130 is discussed in greater detail in accordance with FIG. 2, and how outputs from the occlusion analysis system 130 may be used for behavior prediction is discussed in greater detail in accordance with FIG. 6.

Figure 2:
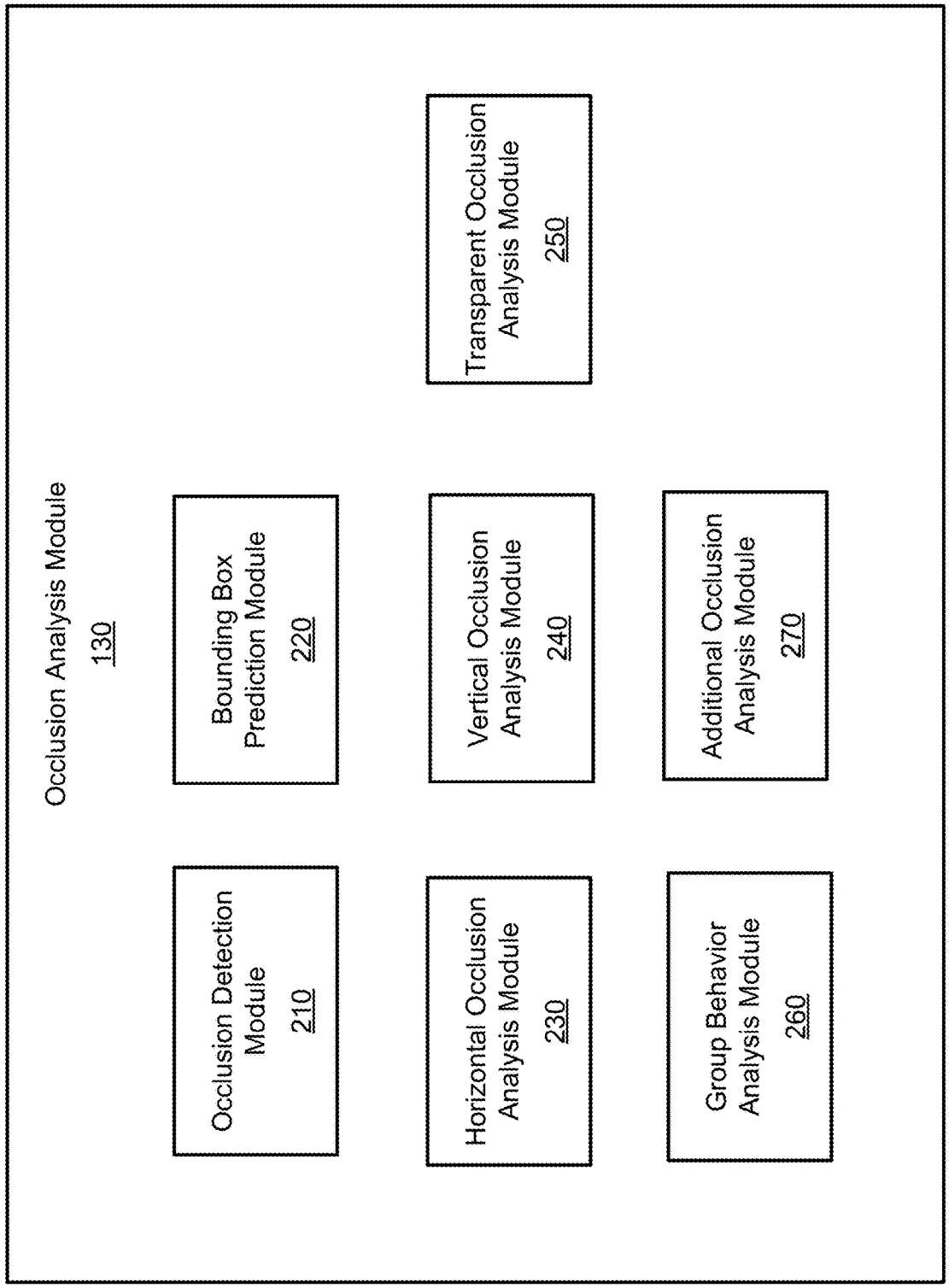
FIG. 2 depicts exemplary modules of an occlusion analysis system, in accordance with one embodiment.

FIG. 2 illustrates exemplary modules of an occlusion analysis system 130, in accordance with one embodiment. The occlusion analysis system 130 may include an occlusion detection module 210 that detects and determines parameters associated with occlusions, a bounding box prediction module 220 that predicts a whole bounding box based on an occluded image, a horizontal occlusion analysis module 230 that detects horizontal occlusions, a vertical occlusion analysis module 240 that detects vertical occlusions, a transparent occlusion analysis module 250 that detects transparent occlusions, a group behavior analysis module 260 that detects group behaviors based on pedestrian occlusions, and an additional occlusion analysis module 270 that detects other types of occlusions.

The occlusion detection module 210 detects and determines parameters associated with occlusions. The occlusion detection module 210 may determine based on a machine learning model trained with labeled data whether occlusion exists in an image. The determination may be binary or numerical. For a binary determination, the occlusion detection module 210 outputs whether a person is occluded. For a numerical determination, the occlusion detection module 210 may determine a representation, such as a percentage, of an amount of and/or area of a person (e.g., area in the image) that is occluded. The occlusion detection module 210 may also detect a direction of an occlusion and a degree of occlusion, which is illustrated and discussed in further details in accordance with FIGS. 3A-3C.

Figure 3B:
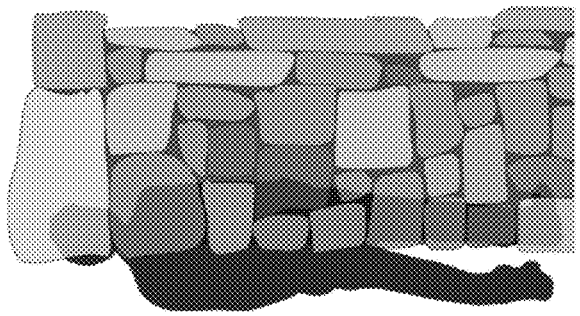
FIG. 3A-C depict exemplary embodiments of occlusion directions, in accordance with one embodiment.
Figure 3C:
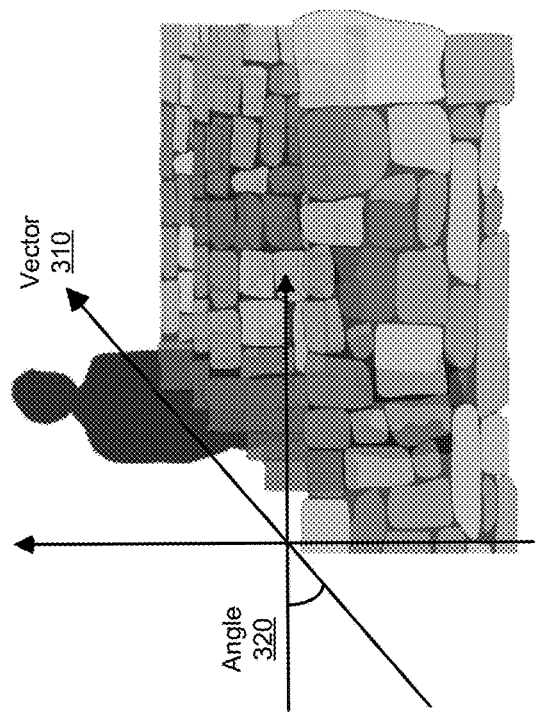
Figure 3A:
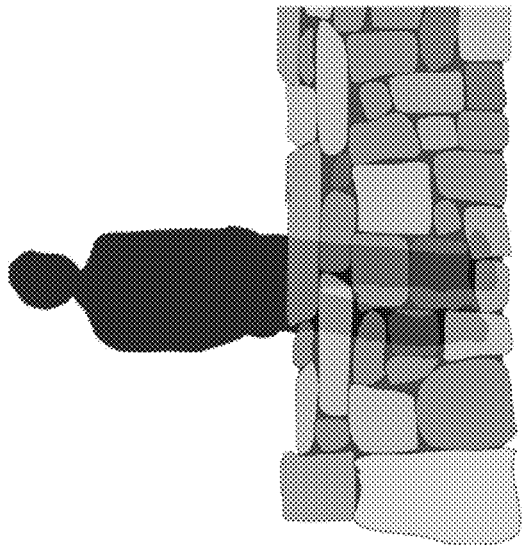

FIGS. 3A-3C depict exemplary embodiments of different directions of occlusion. FIG. 3A depicts a horizontal occlusion where a person's upper body or lower body is occluded. In the example illustrated in FIG. 3A, the person's legs are occluded by a wall, which may introduce uncertainties for the behavior prediction system 140. FIG. 3B depicts a vertical occlusion where a person might be occluded completely and disappear from a frame for a period of time and appear again. The occlusion detection module 210 may further determine additional occlusion parameters such as a direction of the occlusion. FIG. 3C illustrates one exemplary embodiment where the occlusion detection module 210 determines a vector 310 that indicates a direction and/or position of an occlusion and an angle 320 of the direction of the occlusion. Parameters outputted from the occlusion detection module 210 may be passed to the behavior prediction system 140, such as an indication of occlusion, percentage, angle, and direction of the occlusion. The results from the occlusion detection module 210 may be used for further occlusion analysis in the modules discussed below.

Referring back to FIG. 2, the bounding box prediction module 220 predicts a whole bounding box based on an occluded image. In one embodiment, the bounding box prediction module 220 may take the parameters from the occlusion detection module 210 and other information as inputs and predict a full bounding box for the occluded person. The bounding box prediction module 220 may use the percentage and direction of the occlusion to inform the direction and how much percentage to extend for predicting a full bounding box. Further details with regard to full bounding box prediction are illustrated in FIGS. 4A-D.

Figure 4B:
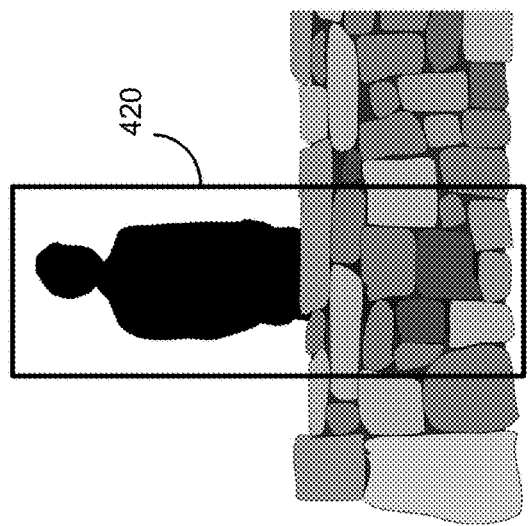
FIGS. 4A-D depict exemplary embodiments of predicting a full bounding box based on an occluded image, in accordance with one embodiment.
Figure 4D:
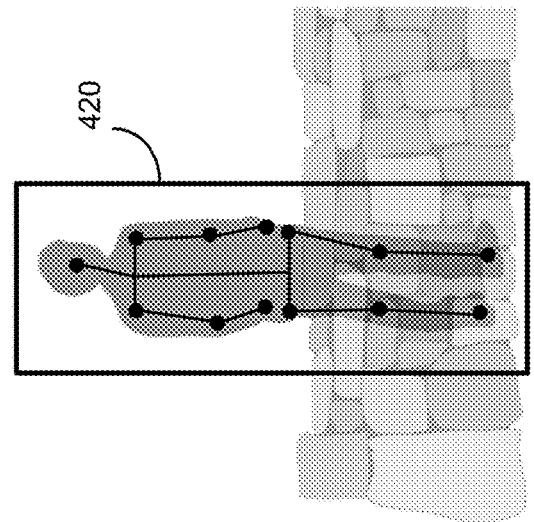
Figure 4A:
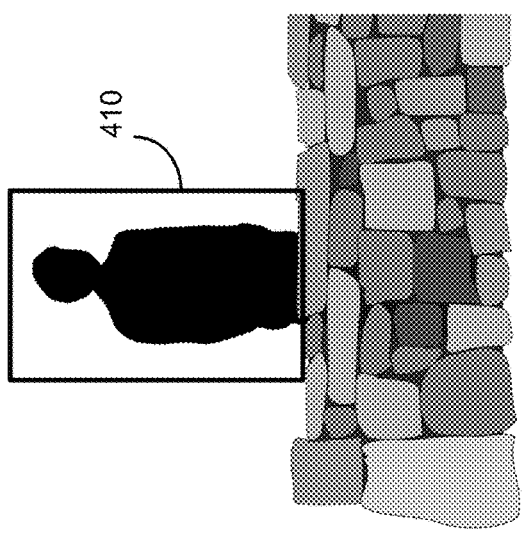
Figure 4C:
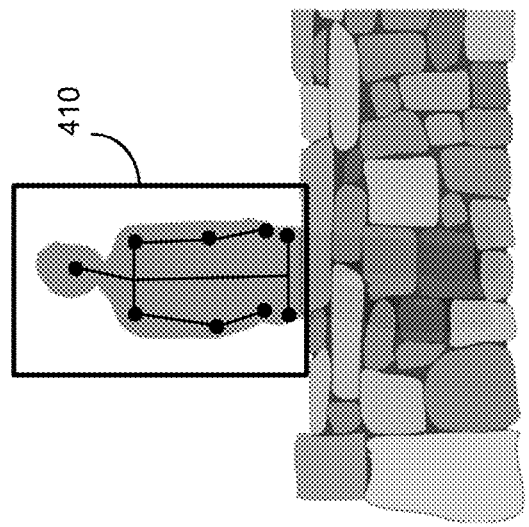

FIGS. 4A-D depict exemplary embodiments of predicting a full bounding box based on an occluded image, in accordance with one embodiment. FIG. 4A depicts a bounding box detection in an image with occlusion. Because the person is occluded, the determined bounding box 410 only encloses a portion of the person. The occlusion detection module 210 may determine that 40% of the person is occluded and that the occlusion is horizontal. The bounding box prediction module 220 may use the information to determine a percentage to extend the truncated bounding box 410 and may generate a full bounding box 420 (as illustrated in FIG. 4B) that is supposed to enclose the whole person. In one embodiment, the bounding box prediction module 220 may also generate a full bounding box based on pose predictions. For example, as illustrated in FIG. 4C, a pose for the upper body is identified based on pose joints of the upper body. The pose identification may include positions of the person's head, trunk, and limbs, as illustrated in FIG. 4C by black dots connected by lines. Based on the pose identified in bounding box 410, a full body pose as illustrated in FIG. 4D is predicted by the behavior prediction system 140. The bounding box prediction module 220 may predict a full bounding box 420 based on the full body pose prediction.

Continuing with the discussion of FIG. 2, the horizontal occlusion analysis module 230 may detect horizontal occlusions, when a horizontal part (e.g., legs) of a human is occluded by an object such as a wall or a car. In one embodiment, the horizontal occlusion analysis module 230 may detect horizontal occlusions by using independent tracking bounding boxes such as a top box and a bottom box to track a human. Responsive to detecting a change in the motion of the top tracking box but not in the bottom (or vice versa), the horizontal occlusion analysis module 230 may detect based on a relative change in motion patterns for the top and bottom tracking boxes, that the person is partially occluded. For example, the horizontal occlusion analysis module 230 may use two (or more) independent bounding boxes to track a moving person, such as a top bounding box for tracking upper body and a bottom bounding box for tracking lower body, and the two bounding boxes align with each other vertically in an initial detection. At a point in time, the horizontal occlusion analysis module 230 may detect that the top bounding box moves at a certain speed, but the bottom bounding box is moving at a different speed. Responsive to detecting a difference in the relative motion between the two bounding boxes, the horizontal occlusion analysis module 230 may determine that the person is occluded. In one embodiment, the image of the occluded person may be extracted and further analysis to the occluded person may be performed by the occlusion detection module 210 and bounding box prediction module 220. In one embodiment, the horizontal occlusion analysis module 230 may identify frames before or after the frame in which occlusion occurs and send the identified frames to the behavior prediction system 140 for behavior prediction.

In one embodiment, the horizontal occlusion analysis module 230 may detect horizontal occlusions by tracking positions of the edges of bounding box and compare the relative change over time. The horizontal occlusion analysis module 230 may track position of the top edge and position of the bottom edge of the bounding box separately. The horizontal occlusion analysis module 230 may compare the positions and determine whether a top occlusion or a bottom occlusion occurred. For example, responsive to detecting that the bottom edge is moving towards the right (relative to the camera) at a certain speed, but the top edge does not move at such a speed, the horizontal occlusion analysis module 230 may determine that the human is partially occluded on the top. In one embodiment, the horizontal occlusion analysis module 230 may detect side occlusion using a similar method. That is, the horizontal occlusion analysis module 230 may detect a relative change in speed in the position of the left edge and the right edge of the bounding box. Based on the detection in the relative change, the horizontal occlusion analysis module 230 may determine that a human is occluded on the side.

The vertical occlusion analysis module 240 may detect vertical occlusions, when a person is vertically occluded by an obstacle. Vertical occlusions (such as a building, a lamp post, etc.) may cause a person completely occluded from a frame of a video stream for a period of time. The vertical occlusion analysis module 240 may detect and output an indication that the occlusion is a vertical occlusion, and then the behavior prediction system 140 may determine to use frames before or after the occluded image that include more information about the person for behavior prediction.

The transparent occlusion analysis module 250 detects transparent occlusions, where a cross-hatched fence or the like obscures part of a human, though the human is generally transparent. The transparent occlusion analysis module 250 may determine (e.g., using object recognition models) that the object that obscures the human is a street divider or a hedge that inform physical constraints of the human, as the human has a lower probability of walking or climbing over a fence and walk into the way of the vehicle. The transparent occlusion analysis module 250 may pass the outputs to the behavior prediction system 140 for behavior prediction. Outputs from the transparent occlusion analysis module 250 resource may also help with allocating computing resources. Because a human walking behind a fence or street divider has a lower chance to cross the path of the vehicle, the behavior prediction system 140 may allocate less computing power for analyzing such individuals and focus on other humans associated with higher risks.

The group behavior analysis module 260 detects group behaviors based on pedestrian occlusions. The group behavior analysis module 260 may detect that a pedestrian is occluding one or more other pedestrians and determine that potential group behaviors may be detected. The group behavior analysis module 260 may train a machine learning model using training data including images labeled with group behavior. For example, the training data may include images labeled with a group and corresponding individuals in the group. In one embodiment, the group behavior analysis module 260 may identify group behaviors based on locations, such as when a crowd is crossing the street. In one embodiment, the group behavior analysis module 260 may identify group behaviors based on similar appearances, such as a group of students with similar uniforms. The group behavior analysis module 260 may use the training data to train machine learning models, that when trained, output predictions that inform group behaviors. The group behavior analysis module 260 may analyze composition of groups or crowds of people, such as whether a person is followed by other people in the group. The outputs may be passed to the behavior prediction system 140 for behavior prediction. The behavior prediction system 140 may use the outputs to determine how the rest of the group might respond or follow a certain person in the group who would set the example of, for example, crossing behavior.

The additional occlusion analysis module 270 detects other types of occlusions. The additional occlusion analysis module 270 may fit occlusion information to a labeled training set mapping different occlusion metrics and image characteristics to different labeled inferences. The additional occlusion analysis module 270 may train machine learning models with the training data and make predictions using the trained models. For example, the additional occlusion analysis module 270 may detect that a person's face is partially occluded, and an object recognition model can infer that the person is wearing a hoodie, or blind people's glasses, or carrying a cell phone, which might in turn cause the behavior prediction system 140 to determine that the person is less attentive towards environment and therefore is associated with higher risk of crossing into the path of the vehicle. As another example, the additional occlusion analysis module 270 may detect occlusion due to challenging contrast/light (shadow, glare) environments. Images that lose information due to lighting may be sent to the bounding box prediction module 220 for full bounding box predictions, and then passed to the behavior prediction system 140. Alternatively, the behavior prediction system 140 may adjust the lighting of the images and recover the lost information in the images for better prediction results.

Behavior Prediction Based on Outputs from the Occlusion Analysis System

Figure 5:
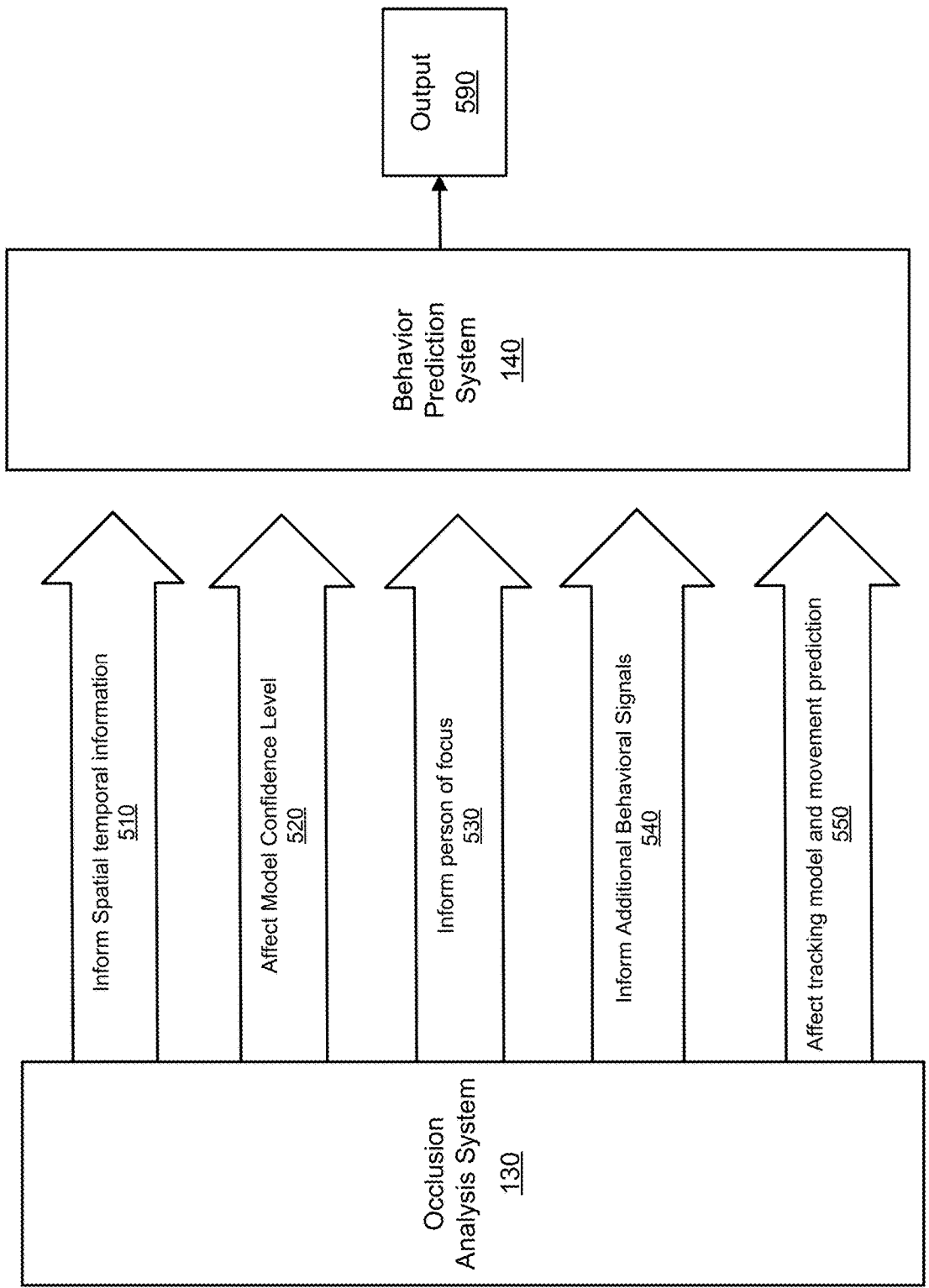
FIG. 5 depicts an exemplary embodiment of using outputs from the occlusion analysis system for behavior prediction, in accordance with one embodiment.

FIG. 5 depicts an exemplary embodiment of predicting behaviors based on outputs from the occlusion analysis system, in accordance with one embodiment. Outputs of the occlusion analysis system 130 provide understanding of occlusion to the behavior prediction system 140 which may utilize the information to improve the behavior predictions.

The behavior prediction system 140 may inform 510 spatial temporal information (e.g., information associated with time and surrounding environment) based on outputs from the occlusion analysis system 130. As mentioned above, a bounding box for an occluded person is smaller than a full bounding box, which may make the person seem further away from the vehicle than the actual distance. The behavior prediction system 140 may estimate a distance longer than the actual distance using an occluded image without occlusion information. In one embodiment to improve the estimation, the occlusion analysis system 140 may generate predicted full bounding box and pass the outputs to the behavior prediction system 140, which may produce a more accurate distance estimation based on the predicted full bounding box. The prediction results may in turn affect the control system such as affecting the determination of when to brake or decelerate the vehicle.

The behavior prediction system 140 may adjust confidence level 520 for behavior prediction based on outputs from the occlusion analysis system 130. In one embodiment, the behavior prediction system 140 may use a modular approach that combines multiple sub-models (e.g., tracking model, attention determination model, locomotion model, etc.) for predicting various aspects of human behaviors. In one embodiment, the occlusion parameters are integrated into the training data and the behavior prediction models are trained using the training data. The behavior prediction system 140 may use the occlusion parameters outputted by the occlusion analysis module 130 (e.g., occlusion indication, occlusion percentage, occlusion direction, etc.) to determine a confidence level for each generated prediction, which allows each model to determine a certainty of the detection and further models that rely on the detection. For example, if a human's legs are occluded by a hedge, the locomotion model may, based on the occlusion parameters (e.g., 60% horizontal bottom occlusion), determine a relatively low confidence level for the prediction, because the locomotion model generates the estimation based on limited data. The behavior prediction system 140 may determine to rely on results of another sub-model with a higher confidence score if such results are available. In one embodiment, each sub-model for behavior prediction is associated with a threshold of confidence level to achieve. Different sub-models may be affected differently by the occlusion parameters. Responsive to a confidence level for a first model being below a first threshold of confidence level, the behavior prediction system 140 may determine to use a second model that is less sensitive to occlusions, and therefore makes predictions associated with a higher confidence level that is higher than a threshold level. In one embodiment the second model may be identified by a determination whether the inputs for the second model leverages any occlusion information. A model that uses data not including (or including little) occlusion information but depends on other types of information such as sensor data, may be less sensitive to occlusions.

In one embodiment, the behavior prediction system 140 may include a multi-threshold system for determining different actions for different confidence intervals. For example, the multi-threshold system may include a high threshold (e.g., 80%) and a low threshold (e.g., 60%), where a confidence level above the high threshold indicates that results of the model can be used for behavior prediction, a confidence level above the low threshold but lower than the high threshold indicates that the behavior prediction system 140 of may need to leverage results from additional models for behavior prediction, and a confidence level below the low threshold may indicate that the behavior prediction system 140 may not use the results for behavior prediction.

The behavior prediction system 140 may determine to focus more processing power on a person of focus 530 based on outputs from the occlusion analysis system 130. In one embodiment, for a group of pedestrians, the group behavior analysis module 260 may determine that a certain person in a group might be followed by a crowd. The behavior prediction system 140 may use the information as input and determine to allocate more processing power to process information related to the certain person and generates a more accurate behavior prediction for the particular person. In another embodiment, the behavior prediction system 140 may determine that a pedestrian is walking behind a fence based on results from the transparent occlusion analysis module 250, and as a result, the behavior prediction system 140 may decide to focus less processing power on the pedestrian, because the pedestrian is unlikely to cross the path of the vehicle.

The occlusion analysis system 130 may further inform the behavior prediction system 140 additional behavioral signals 540 that further enhance behavior predictions. In one embodiment, the behavior prediction system 140 may receive output from the occlusion analysis system 130 indicating that a portion of the body of a person is occluded (e.g., the back of the head and peripherals if a human is wearing a hoodie, the ear if the human is carrying a telephone to his ear, the eyes if blind person glasses are detected, and so on), which might in turn cause the behavior prediction system 140 to determine that the person is less attentive towards their environment, and the behavior prediction system 140 may predict a higher risk associated with such individuals. In one embodiment, the occlusion analysis system 130 may predict that a person is riding a motorbike because a leg of the person is occluded viewing from a side view. The occlusion analysis system 130 may associate the image with a label of a VRU riding a motorbike and passes the information to the behavior prediction system 140, which may apply related models for behavior predictions for motorbike riders. In one embodiment, the occlusion analysis system 130 may predict that a person is riding an e-scooter because a leg of the person is occluded viewing from a front view. The occlusion analysis system 130 may associate the image with a label of a VRU riding an e-scooter and passes the information to the behavior prediction system 140, which may apply related models for behavior predictions for e-scooters.

The occlusion analysis system 130 may further affect tracking models 550 of the behavior prediction system 140. In one embodiment, the behavior prediction system 140 may make frame-based estimations and extract uncertainty for each frame. For a sequence of frames, the behavior prediction system 140 may use occlusion parameters from the occlusion analysis system 130 to determine how the uncertainty changes over time, which may improve the quality of tracking, and in turn has downstream accuracy gains for every model that relies on the tracking information. In one embodiment, the tracking models may determine to use frames with higher certainty (e.g., less occlusions) for analyzing characteristics associated with the person. With more information extracted from frames with less occlusion, the tracking models may be able to track individuals with a higher accuracy.

FIG. 6 depicts an exemplary process for behavior prediction based on occlusion analysis, in accordance with one embodiment. Process 600 may start with the occlusion analysis system 130 receiving 610 a video comprising a sequence of frames, and at least in one of the frames, a human is partially or wholly visible. The occlusion analysis system 130 may apply 620 the sequence of frames to one or more occlusion models, where the occlusion models are trained machine learning models for detecting occlusion of humans in a video. The behavior prediction system 140 may receive 630 outputs from the occlusion analysis system 130, where the outputs are occlusion parameters that inform occlusion information. The behavior prediction system 140 may input 640 the occlusion parameters as well as other parameters relating to activity of the human (e.g., appearance, movement, location, etc.) into a second machine learning model for behavior prediction. The second machine learning model may be a higher-level model trained to output a prediction that the human will exhibit a future behavior and a confidence level associated with the prediction. The confidence level is at least partially determined based on the occlusion parameters. The behavior prediction system 140 may output 650 the prediction and the confidence level to a control system that generates commands for a vehicle or generates alerts for the driver.

Additional Considerations

The foregoing description of the embodiments of the invention has been presented for the purpose of illustration; it is not intended to be exhaustive or to limit the invention to the precise forms disclosed. Persons skilled in the relevant art can appreciate that many modifications and variations are possible in light of the above disclosure.

Some portions of this description describe the embodiments of the invention in terms of algorithms and symbolic representations of operations on information. These algorithmic descriptions and representations are commonly used by those skilled in the data processing arts to convey the substance of their work effectively to others skilled in the art. These operations, while described functionally, computationally, or logically, are understood to be implemented by computer programs or equivalent electrical circuits, microcode, or the like. Furthermore, it has also proven convenient at times, to refer to these arrangements of operations as modules, without loss of generality. The described operations and their associated modules may be embodied in software, firmware, hardware, or any combinations thereof.

Any of the steps, operations, or processes described herein may be performed or implemented with one or more hardware or software modules, alone or in combination with other devices. In one embodiment, a software module is implemented with a computer program product comprising a computer-readable medium containing computer program code, which can be executed by a computer processor for performing any or all of the steps, operations, or processes described.

Embodiments of the invention may also relate to an apparatus for performing the operations herein. This apparatus may be specially constructed for the required purposes, and/or it may comprise a general-purpose computing device selectively activated or reconfigured by a computer program stored in the computer. Such a computer program may be stored in a non-transitory, tangible computer readable storage medium, or any type of media suitable for storing electronic instructions, which may be coupled to a computer system bus. Furthermore, any computing systems referred to in the specification may include a single processor or may be architectures employing multiple processor designs for increased computing capability.

Embodiments of the invention may also relate to a product that is produced by a computing process described herein. Such a product may comprise information resulting from a computing process, where the information is stored on a non-transitory, tangible computer readable storage medium and may include any embodiment of a computer program product or other data combination described herein.

Finally, the language used in the specification has been principally selected for readability and instructional purposes, and it may not have been selected to delineate or circumscribe the inventive subject matter. It is therefore intended that the scope of the invention be limited not by this detailed description, but rather by any claims that issue on an application based hereon. Accordingly, the disclosure of the embodiments of the invention is intended to be illustrative, but not limiting, of the scope of the invention, which is set forth in the following claims.

What is claimed is:

1. A method comprising:
    receiving a video comprising a sequence of frames where at least a part of a human is visible in a given frame of the sequence of frames;
    applying the sequence of frames to an occlusion model, wherein the occlusion model is a machine learning model trained to detect occlusion of the human in the video;
    receiving, as output from the occlusion model, one or more occlusion parameters;
    inputting the one or more occlusion parameters as well as other parameters relating to activity of the human into a second model that predicts that the human will exhibit a future behavior or recognizes a current behavior of the human based on the other parameters, wherein the second model outputs a confidence level associated with the prediction that is based on the one or more occlusion parameters, wherein the confidence level is determined based on whether the one or more occlusion parameters indicate that the human is occluded in the given frame; and outputting the prediction and the confidence level to a control system, wherein the control system, responsive to the confidence level being below a first threshold level associated with the second model, selects a third model for behavior predictions, wherein a predicted confidence level for the third model predicted using the one or more occlusion parameters is greater than a second threshold confidence level associated with the third model.

2. The method of claim 1, wherein the one or more occlusion parameters in the output from the occlusion model is a percentage of the human that is occluded in the given frame.

3. The method of claim 2, wherein the one or more occlusion parameters in the output from the occlusion model include a degree of direction of an occlusion of the human in the given frame.

4. The method of claim 3, wherein the percentage and the degree of direction of occlusion are used to adjust predicted velocity and distance of the human.

5. The method of claim 1, wherein the one or more occlusion parameters includes a binary indication of whether the human is occluded, and wherein the binary indication is used as input for the second model.

6. The method of claim 1, wherein the occlusion model predicts a second bounding box illustrating the human without occlusion based on a first bounding box depicting the part of the human that is not occluded.

7. The method of claim 1, wherein the occlusion model predicts a pose of the human based on a part of the human in the given frame that is not occluded.

8. The method of claim 1 further comprising, responsive to detecting occlusion in the given frame, determining to use another given frame that is before or after the given frame in the video, wherein the human is not occluded in the other given frame.

9. The method of claim 1, further comprising:

responsive to detecting that processing power is below a threshold, determining to focus the processing power on an area of focus of the given frame based on the one or more occlusion parameters.

10. The method of claim 1, wherein the occlusion model further detects occlusion caused by a lighting environment.

11. The method of claim 1, wherein the occlusion model determines that the human belongs to a group of people based on an analysis of a pattern that the human is occluded by another human in the group.

12. The method of claim 1, wherein the occlusion model is a standalone model or is embedded in the second model.

13. A non-transitory computer-readable storage medium comprising memory with executable computer instructions encoded thereon that, when executed by one or more processors, cause the one or more processors to perform operations, the instructions comprising instructions to:

receive a video comprising a sequence of frames where at least a part of a human is visible in a given frame of the sequence of frames;

apply the sequence of frames to an occlusion model, wherein the occlusion model is a machine learning model trained to detect occlusion of the human in the video;

receive, as output from the occlusion model, one or more occlusion parameters;

input the one or more occlusion parameters as well as other parameters relating to activity of the human into a second model that predicts that the human will exhibit a future behavior or recognizes a current behavior of the human based on the other parameters, and to also output a confidence level associated with the prediction that is based on the one or more occlusion parameters, wherein the confidence level is determined based on whether the one or more occlusion parameters indicate that the human is occluded in the given frame; and output the prediction and the confidence level to a control system, wherein the control system, responsive to the confidence level being below a first threshold level associated with the second model, selects a third model for behavior predictions, wherein a predicted confidence level for the third model predicted using the one or more occlusion parameters is greater than a second threshold confidence level associated with the third model.

14. The non-transitory computer-readable storage medium of claim 13, wherein the one or more occlusion parameters in the output from the occlusion model is a percentage of the human that is occluded in the given frame.

15. The non-transitory computer-readable storage medium of claim 13, wherein the one or more occlusion parameters includes a binary indication of whether the human is occluded, and wherein the binary indication is used as input for the second model.

16. The non-transitory computer-readable storage medium of claim 13, wherein the instructions further comprise instructions to, responsive to detecting occlusion in the given frame, determine to use another given frame that is before or after the given frame in the video, wherein the human is not occluded in the other given frame.

* * * * *